Figure 1:
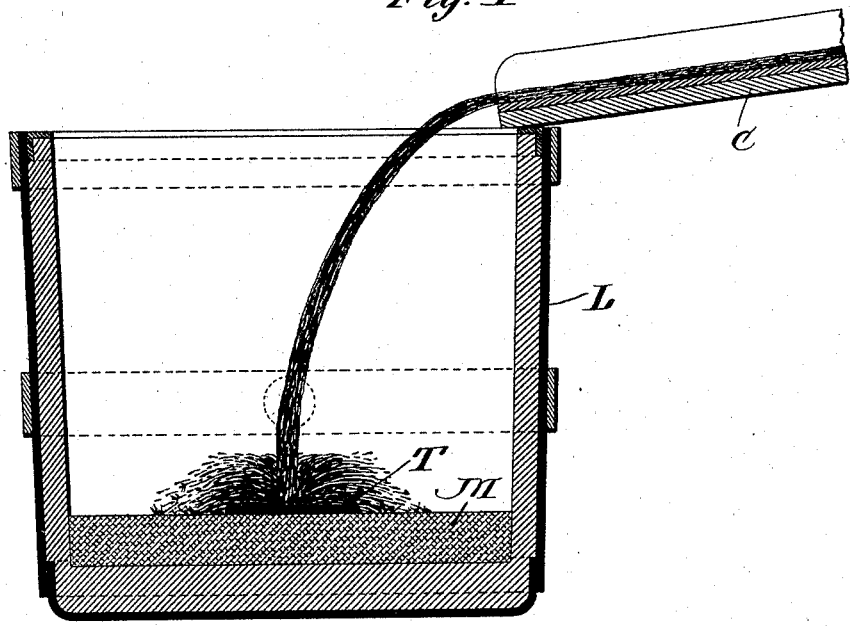

(No Model.) 2 Sheets—Sheet 1.

E. H. SANITER.
PROCESS OF PURIFYING IRON.

No. 581,942. Patented May 4, 1897.

Witnesses
A. C. Harrison
Edward F. Allen.

Inventor
Ernest H. Saniter.
By Crosby Gregory
Attys.

(No Model.) 2 Sheets—Sheet 2.

E. H. SANITER.
PROCESS OF PURIFYING IRON.

No. 581,942. Patented May 4, 1897.

Witnesses
A. C. Harmon
Edward F. Allen

Inventor
Ernest H. Saniter
by Crosby Gregory
Attys.

UNITED STATES PATENT OFFICE.

ERNEST H. SANITER, OF WIGAN, ENGLAND.

PROCESS OF PURIFYING IRON.

SPECIFICATION forming part of Letters Patent No. 581,942, dated May 4, 1897.

Application filed September 19, 1893. Serial No. 435,884. (No specimens.) Patented in Belgium January 21, 1892, No. 98,005; in England May 6, 1892, No. 8,612^A; in France July 13, 1892, No. 222,976; in Luxemburg August 6, 1892, No. 1,666, and in Austria-Hungary January 21, 1893, No. 52,443 and No. 80,445.

*To all whom it may concern:*

Be it known that I, ERNEST HENRY SANITER, a subject of the Queen of Great Britain, residing at Wigan, in the county of Lancaster, in the Kingdom of England, have invented certain new and useful Improvements in the Purification of Iron, (for which I have received Letters Patent in England, No. 8,612^A, dated May 6, 1892; in Belgium, No. 98,005, dated January 21, 1892; in France, No. 222,976, dated July 13, 1892; in Luxemburg, No. 1,666, dated August 6, 1892, and in Austria-Hungary, No. 52,443 and No. 80,445, dated January 21, 1893,) of which the following is a specification.

This invention has for its object the purification of liquid cast-iron by the elimination of sulfur therefrom and to this end my process consists in bringing a mixture of chlorid and fluorid of calcium and carbonate, hydrate, or oxid of calcium in prolonged contact with molten cast-iron in the manner hereinafter described.

In working the process I do not confine myself to calcium compounds above mentioned, as it may sometimes be advantageous for cheapness to use such compounds as chlorid and fluorid of magnesia or iron, which would be converted into chlorid and fluorid of calcium by mixing with the lime and heating. For the same reason magnesian limestone or lime may sometimes be used instead of ordinary lime.

The several alkaline earths and their hydrates and carbonates are the equivalents of lime for the purposes of this process.

I find the following mixture to be very efficient: Quantities for one ton of iron: calcium chlorid, nine pounds; fluor-spar, nine pounds; lime, twelve pounds; limestone, fourteen pounds.

I do not confine myself to the above mixture, the proportions or weights of which may be varied according to the quality and temperature of the iron and the time required for filling the ladle, or one or more of the substances used may be omitted and its or their chemical equivalent substituted. Thus lime and limestone can be interchanged. The materials are then ground together to bring them to a fine powder and mix them thoroughly.

This mixture is now placed on the bottom of an ordinary ladle or other suitable receiving vessel and pressed well down.

A small cast-iron plate is placed on the mixture in such a position that when the cast-iron is run in it strikes the plate and thus does not disturb the mixture; or the ladle can be formed with a well in the bottom, say, twelve inches deep. This well is filled with the mixture and can be formed by bricking up the surrounding space. In filling the ladle the metal can be poured on the step of brickwork thus formed. In this way the metal flows over and covers the mixture without cutting into it. The molten cast-iron is now run into the ladle direct from the blast-furnace or other melting-furnace until the ladle is full, care being taken to keep out the slag. The heat of the molten cast-iron now gradually melts the mixture at the bottom of the ladle, which, rising through the metal, removes the sulfur, the time occupied being about twenty minutes.

The advantage of this process will be readily seen, as by its means sulfury iron direct from the blast-furnace can be rendered suitable for steel-making at a very small cost and without expensive plant. Many thousands of tons of iron have been treated in this way in England, the sulfur eliminated being on an average eighty per cent.

The ladle or receiver used may be lined with either acid, basic, or neutral material.

I have not been able to ascertain the exact reactions which take place; but it would appear as if the sub or oxy chlorid or fluorid of calcium were formed with the lime, which, being more readily decomposable than lime, allows the nascent calcium to attack the sulfid of iron, the excess of lime being necessary to maintain the stability of the calcium sulfid when formed.

Figure 2:
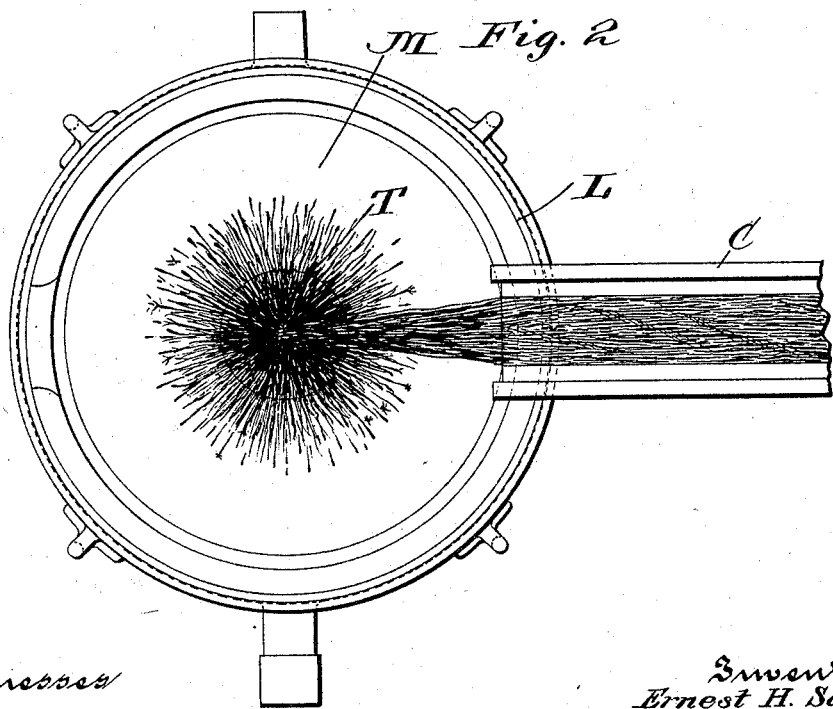
Figure 3:
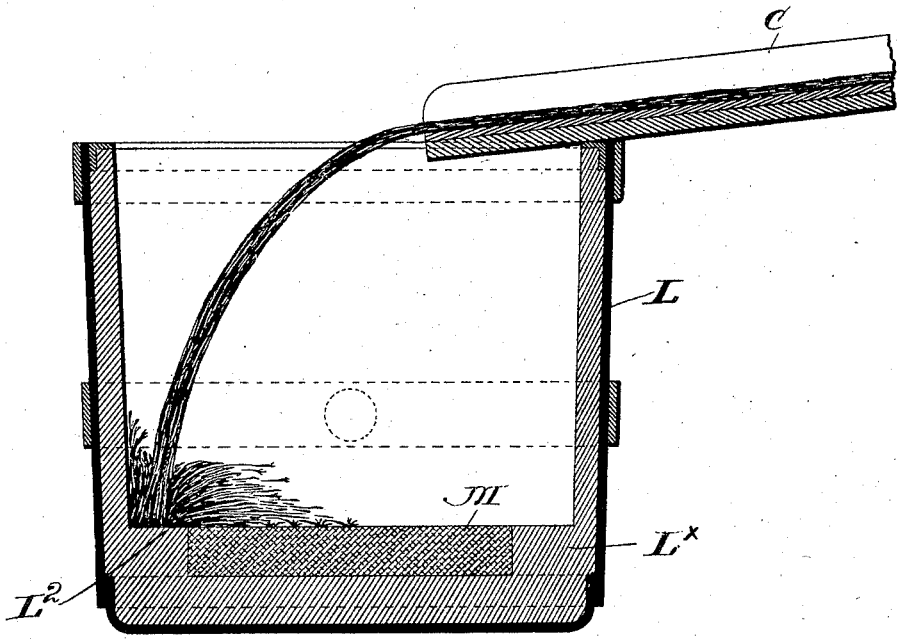

In the drawings, Figure 1 is a vertical sectional view of a ladle, showing one mode of carrying out my invention. Fig. 2 is a top or plan view thereof. Fig. 3 is a vertical sectional view of a ladle, showing a modification in the use of the ladle in carrying out my invention; and Fig. 4 is a top or plan view thereof.

Referring to Figs. 1 and 2, the ladle L is shown as having placed upon its bottom a mixture M of an alkaline earth and chlorid and fluorid of an alkaline-earth metal, and upon the mixture is placed a plate of preferably cast-iron, T, on which the molten metal impinges as it flows from the channel C.

The molten metal, striking the plate T, flies out in all directions and gently flows over the mixture M until the level of the metal has risen several inches, when the tile or plate can float away or be fused, as the case may be, the layer of molten metal in the ladle being then sufficiently deep to prevent the incoming stream of the metal from breaking up the mixture M.

Figure 4:
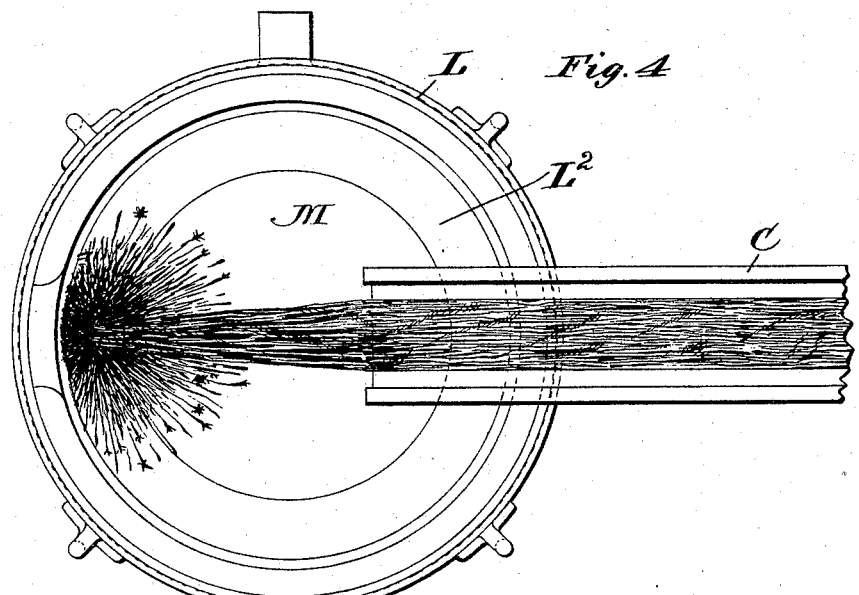

In Figs. 3 and 4 the ladle-lining $L^x$ is formed with a well surrounded by a step or curb $L^2$, and the well is filled with the mixture M of chemicals, and in filling the ladle the channel C is so placed that the stream of entering metal strikes upon the curb $L^2$ and then flows over the mixture without cutting it.

I am aware that desulfurization by various reagents during the conversion of cast-iron into steel has before been proposed, but this is not within the scope of my invention, which contemplates desulfurization of molten cast-iron without materially decarburizing it and without converting the cast-iron into steel. In fact the conversion of the cast-iron into steel is purposely omitted, because I thereby avoid the oxidizing conditions necessary for the removal of the carbon from the iron, which conditions are in themselves strongly opposed to the elimination or removal of sulfur.

The avoidance of the conversion into steel not only makes the present process simple and cheap, but effective.

Having thus described my invention and specifically disclaiming the use of reagents during the conversion of cast-iron into steel, what I claim as my invention is—

1. The herein-described process of making desulfurized cast-iron, which consists in bringing the molten cast-iron into contact with an alkaline earth and chlorid and fluorid of an alkaline-earth metal without decarburizing the iron, substantially as described.

2. The herein-described process of making desulfurized cast-iron, which consists in bringing the molten cast-iron into contact with lime and chlorid and fluorid of an alkaline-earth metal without decarburizing the iron, substantially as described.

3. The herein-described process of making desulfurized cast-iron, which consists in bringing the molten cast-iron into contact with lime and chlorid and fluorid of calcium without decarburizing the iron, substantially as described.

4. The herein-described process of making desulfurized cast-iron without decarburizing the same, which consists in passing lime and chlorid and fluorid of calcium up through the molten iron from below, substantially as described.

5. The herein-described process of making desulfurized cast-iron, which consists in pouring the molten iron upon a fusible mixture of lime and chlorid and fluorid of calcium, the heat of the superposed molten metal melting the mixture, substantially as described.

6. The herein-described process of desulfurizing molten cast-iron, which consists in pouring the molten metal upon a protective plate partially interposed between it and a fusible mixture of an alkaline earth and a haloid salt of an alkaline-earth metal, the heat of the molten metal thereafter melting the mixture beneath the plate that it may pass up throughout the molten iron, substantially as described.

7. The herein-described process of desulfurizing molten cast-iron, which consists in pouring the molten metal upon a protective plate partially interposed between it and a fusible mixture of lime and chlorid and fluorid of calcium, the heat of the molten metal thereafter melting the mixture beneath the plate that it may pass up throughout the molten iron, substantially as described.

In testimony whereof I have signed my name to this specification in the presence of two subscribing witnesses.

E. H. SANITER.

Witnesses:
JOHN GRAHAM,
JOSHUA UNSWORTH.